Dec. 18, 1962
M. H. GROVE
3,069,130
PLUG VALVE
Filed Oct. 9, 1959
2 Sheets-Sheet 1
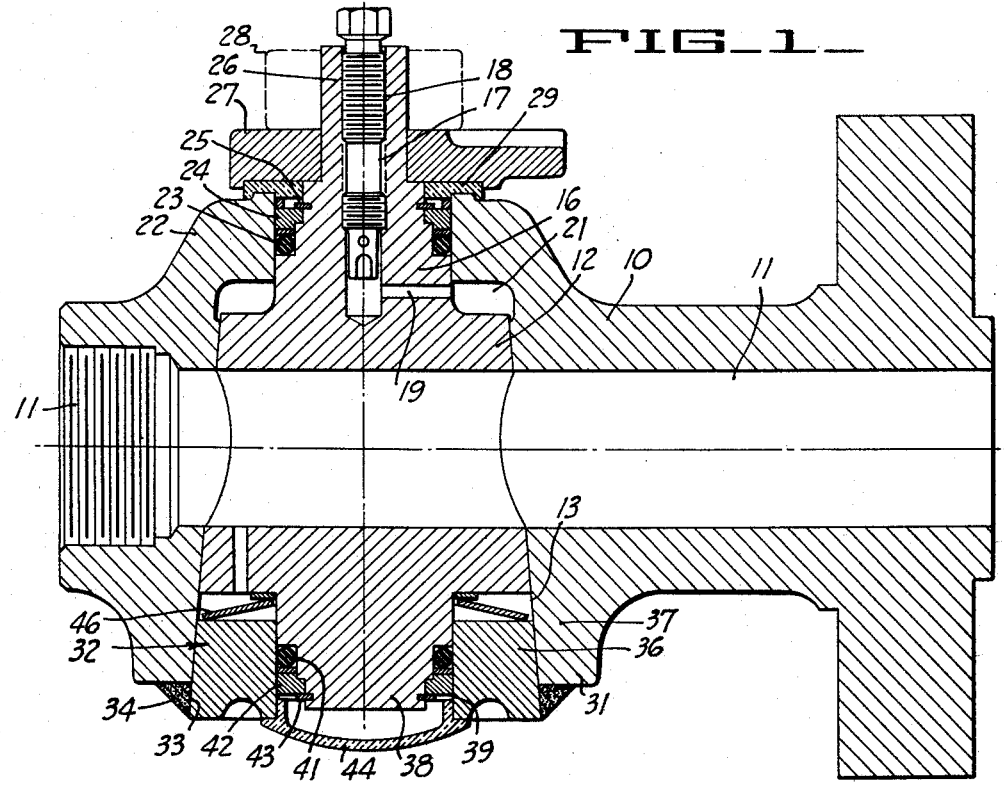
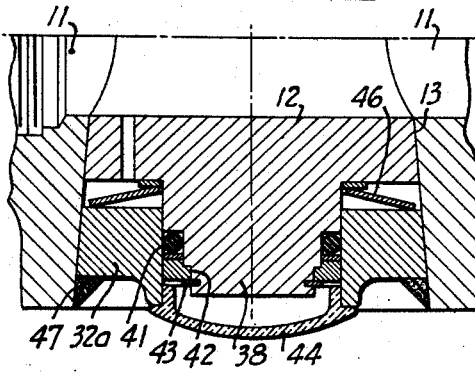
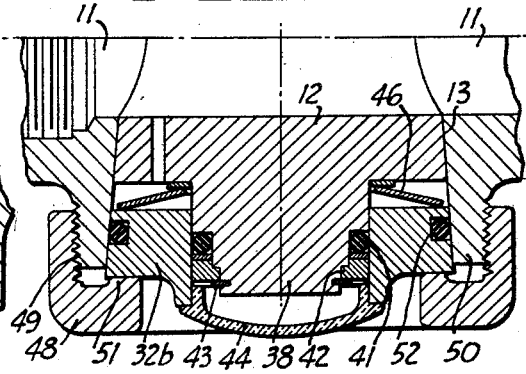
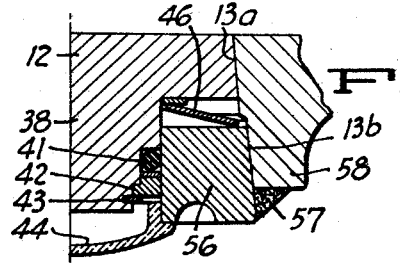
INVENTOR.
Marvin H. Grove
BY
ATTORNEYS

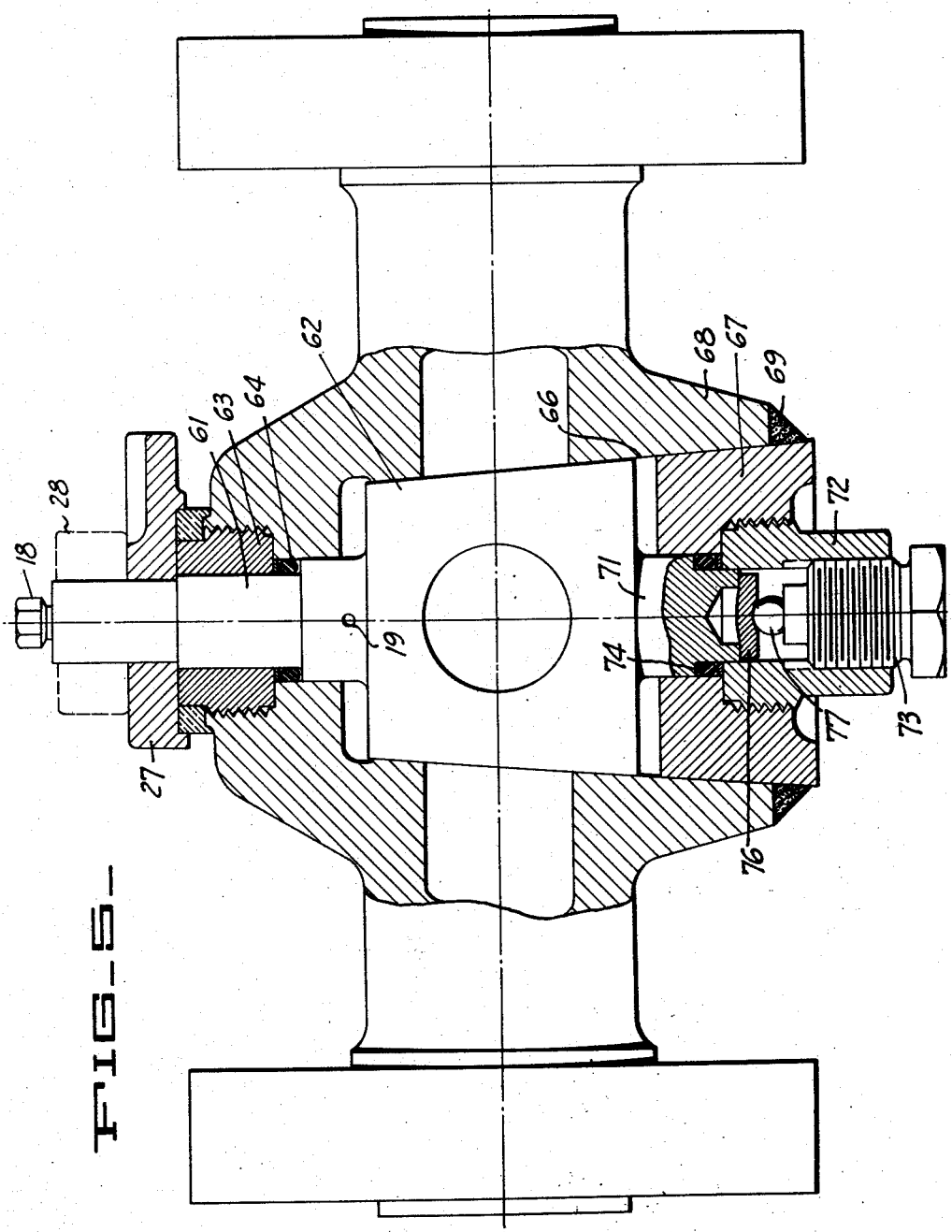

United States Patent Office 3,069,130
Patented Dec. 18, 1962

3,069,130
PLUG VALVE
Marvin Henry Grove, 340 Hillside Ave., Piedmont, Calif.
Filed Oct. 9, 1959, Ser. No. 845,536
4 Claims. (Cl. 251—283)

This invention relates generally to the construction of valves of the tapered plug type.

Tapered plug valves are used in a wide variety of industrial applications. It is common to provide such valves with means for applying lubricant under pressure, whereby the plug can be jacked to free it from its seat, and the valve working surfaces provided with lubrication. When such valves are constructed for the higher operating pressures, as for example pressures of the order of 1000 p.s.i. or higher, and in the larger sizes (e.g. 4 inch pipe size or larger) certain problems are involved due to the fluid pressure forces applied to the plug and the body. Particularly the magnitude of such forces tends to distort the body, with resulting distortion of the tapered bore from its true conical form. This interferes with proper seating of the plug, with the result that the plug may not turn freely, and may not provide tight shut off for closed position. Because of such difficulties, engineers commonly increase the thickness of the walls of body to provide greater rigidity, although the wall thickness employed may be considerably greater than that theoretically required to withstand the fluid pressures involved. This necessarily results in the use of excessive amounts of metal for a valve of given pressure rating and size.

The difficulties outlined above are particularly evident in plug valves of the type using an inverted plug. Inverted plug valves have an operating stem connected to the small end of the plug. Generally the large end of the tapered bore is closed by a head plate which is attached to a body by bolts. This bolted-on head construction is relatively expensive, and it does not provide any substantial amount of support for the adjacent end portion of the body, with the result that such bodies are particularly subject to distortion when subjected to high operating pressures. Furthermore, in assembly, application of such a bolted-on head may of itself apply stresses with resulting distortion of the body bore. Head closures that are threaded into the body likewise do not prevent such body distortions.

In general it is an object of the present invention to provide a tapered plug valve, construction of which is of the inverted type, and which has means which is effective both to form a closure for the large end of the bore and to support the body against distortion.

Another object of the invention is to provide a valve construction as described above, which is substantially less expensive than inverted plug valves having conventional bolted-on heads.

Another object of the invention is to provide a valve construction which greatly facilitates assembly and manufacturing operations, and which will retain the tapered bore of the body relatively true to the desired conical shape.

Additional objects and features of the invention will appear from the following description in which the preferred embodiments have been described in conjunction with the accompanying drawing.

Referring to the drawing:

FIGURE 1 is a side elevational view illustrating a valve incorporating the present invention.

FIGURE 2 is a detail in section illustrating another embodiment of the invention.

FIGURE 3 is a view like FIGURE 2 illustrating a third embodiment.

FIGURE 4 is a detail in section illustrating a modification of FIGURE 1, in which the closure engages a stepped portion of the body bore.

FIGURE 5 shows another embodiment in which different means is employed to yieldably urge the plug into the tapered bore.

The inverted plug type of valve illustrated in FIGURE 1 consists of a body 10 formed of suitable material such as cast or forged metal like steel, steel alloy or the like, and having flow passages 11 for making connection with associated piping. The tapered valve plug 12 is seated within the tapered bore 13, with the contacting surfaces lapped or otherwise finished to form valve working surfaces.

A stem 16 is attached to the small end of the plug, and may be provided with a bore 17 for receiving the screw 18 for introducing lubricant under pressure. Duct 19 conducts the lubricant to the space 21 at the small end of the plug, and from thence it may flow through grooves or ducts (not shown) that are distributed between the valve working surfaces.

The body is provided with an annular portion 22, which is bored to receive the stem 16, and which in effect forms an integral bonnet for closing the small end of the bore. Suitable means is provided for forming a seal between the stem and the body, as for example a seal ring 23 of the resilient O-ring type. This O-ring is shown being held in place by the collar 24, together with the snap-in ring 25.

The exterior portion 26 of the stem is shown squared to receive the stop collar 27, and to accommodate a wrench 28 (shown in dotted lines). A resilient seal washer 29 can be interposed between the stop collar 27 and the adjacent end of the body to prevent entrance of dust or other foreign material.

The tapered bore 13 at its larger end continues through the adjacent annular end portion 31 of the body. Beyond the adjacent end of the plug the bore 13 accommodates the closure 32. This closure is formed of suitable metal, such as cast or forged steel or metal alloy, and it is machined to have an outer tapered periphery 33 that is dimensioned to tightly interfit the bore 13. The exterior side of the closure member 32 has a connection which extends continuously about its entire periphery, and which holds the member in the operative position shown in FIGURE 1. In this instance the connecting means is a circular weld connection 34. With the dimensions illustrated the closure provides an inner annular portion 36, which has a tapered periphery and which tightly interfits and supports the adjacent portion of the tapered bore 13. As it is well known to those familiar with the application of circular weld connections, the weld 34 tends to cause the annular portion 31 to be drawn inwardly, thereby providing a tight fit for portion 36 in the bore.

Assuming that the valve is of the balanced type, the large end of the plug can be provided with a cylindrical balancing member 38 which is machined to interfit the bore 39 formed in the closure 32. Suitable sealing means is provided between the balancing member 38 and the closure, such as the resilient seal ring 41 of the resilient O-ring type. The O-ring is shown being retained by the collar 42, and the snap-in ring 43. The outer end of the bore 39 is shown being closed by the dust cap 44. Yieldable means is provided tending to urge the plug in the direction of its smaller end. For this purpose I have shown a spring washer 46 of the Belleville type, which is interposed between the inner face of the closure member 32, and the adjacent end face of the plug.

In the manufacture of my valve, the parts are finished by customary methods after which the plug is inserted into the bore 13 with its associated parts, and the closure 32 pressed in with considerable force to provide a tight or press fit. Suitable means is applied to hold the plug in place while the weld connection is being applied. Providing a tight or press fit as just described forces the bore to assume its true conical form. Also in effect it causes a prestressing of the body in the annular portion surrounding the closure.

The valve described above has a number of desirable features. Because of the manner in which the closure 32 interfits the body and holds the bore 13 to the desired true conical shape, distortions under high operating pressures are held to a minimum, even for valves of the larger sizes. Likewise during assembly the body is not distorted, but on the contrary it is necessarily shaped to form a true valve working surface. In the design of valves incorporating my invention it is not necessary to provide excess metal for the walls of the body, to prevent undesired body distortion. It is sufficient to design the walls to withstand the fluid pressures involved.

The embodiment illustrated in FIGURE 2 is similar to that of FIGURE 1. However, in this instance the closure 32a, corresponding to closure 32 of FIGURE 1, is disposed entirely within the large end of the bore 13, and its outer face is attached to the adjacent portion of the body by the circular weld connection 47. Here again the member 32 serves to hold the tapered bore 13 to its desired true conical form.

In the embodiment of FIGURE 3, a different kind of means is employed for forming the connection between the closure 32b, and the body. Thus instead of a weld connection, an annular member 48 is provided which has a threaded connection 49 with the exteriorly threaded annular portion 50 of the body. A clamping shoulder 51 engages the outer face of the closure 32b, whereby the closure is forced into the bore to form the desired bore supporting relationship. Suitable sealing means is provided in this instance between the closure 32b and the body, such as a seal ring 52 of the resilient O-ring type. The exterior threaded engagement, in contrast with a closure threaded into the body, provides adequate clamping forces without causing body distortion.

FIGURE 4 shows another embodiment in which a stepped bore is employed. Thus the body bore 13a terminates short of the closure 56, and there is a larger taper step bore 13b within which closure 56 is fitted. Here again the closure has a weld connection 57 to the annular portion 58 of the body.

In FIGURE 5, the stem 61 of the tapered plug 62 extends through the bonnet closure 63 which is threaded into the body. The stem is sealed by suitable means such as the resilient O-ring 64. The tapered bore 66 in which the plug is seated is extended to accommodate the closure 67. This closure has a conical shaped periphery and is pressed into the bore 66 in the same manner as described in connection with FIGURE 1. It is attached to the annular portion 68 of the body by the weld connection 69.

The closure 67 in FIGURE 5 is bored to accommodate the balancing stem 71. The fitting 72 is threaded into the closure 67, and the fitting is internally threaded to receive the plug 73. The balancing stem 71 is sealed with respect to the closure as by means of the seal ring 74 of the O-ring type. A spring disk 76 formed of suitable spring metal is seated upon the end of the stem 71 and is engaged by the ball 77. By suitable adjustment of plug 73, disk 76 is maintained in sprung condition whereby the plug is yieldably urged into the tapered bore to thereby maintain proper seating pressure.

I claim:

1. In a valve construction, a body having an inner tapered bore forming valve working surfaces and flow passages communicating with the sides of the bore, a tapered valve plug fitted within the bore and having its peripheral surfaces seated upon the valve working surfaces of the bore, the large end portion of the bore extending through the adjacent end of the body, an operating stem connected to the small end of the plug and operable from the exterior of the body for turning the plug between open and closed positions, the plug having a port extending therethrough adapted to register with the flow passages for open position of the same, a closure for said large end portion of the bore, said closure having a rigid annular portion with a smooth peripheral surface that is tightly and non-rotatively fixedly fitted within the large end portion of the tapered bore to provide means for maintaining said bore true to the desired conical form, and means forming a continuous circular connection between the outer side of the closure and the adjacent end of the body for retaining the closure in operative position, said large end of the tapered bore presenting a smooth peripheral surface for engagement with the smooth peripheral surface of said annular portion of said closure and holding said closure fixed relative to the body.

2. A valve as in claim 1 in which said last named means is a circular weld connection with an exterior peripheral portion of said closure to form a connection between said closure and the adjacent portion of the body.

3. In a plug valve construction, a body having an inner tapered bore forming valve working surfaces and flow passages communicating with the sides of the bore, a tapered valve plug fitted within the bore and having its peripheral surfaces seated upon the valve working surfaces of the bore, the large end portion of the bore extending through the adjacent end of the body, a stem attached to the small end of the plug and extending to the exterior of the body, sealing means between said stem and the body, a balancing member having a cylindrical peripheral surface and attached to the large end of the plug, a rigid closure member surrounding said balancing member, sealing means forming a seal between the balancing member and the closure, the closure having a rigid inner annular portion with a smooth conical peripheral surface that is tightly fitted within the large smooth end portion of the bore and held fixed relative to the body to provide means for maintaining said bore true to the desired conical form, and means forming a circular weld connection between the outer side of the closure and said end of the body for retaining the closure in operative position.

4. In a valve construction, a body having an inner tapered bore forming valve working surfaces and flow passages communicating with the sides of the bore, a tapered valve plug fitted within the bore and having its peripheral surfaces seated upon the valve working surfaces of the body, the large end portion of the bore extending through the adjacent end of the body, said adjacent end of the body being an annular wall portion, an operating stem connected to the small end of the plug and operable from the exterior of the body for turning the plug between open and closed positions, the plug having a port extending therethrough adapted to register with the flow passages for open position of the same, a closure for said large end portion of the bore, said closure having a rigid annular portion with a smooth tapered peripheral surface that is entirely fitted within the large end portion of the tapered bore to provide means for maintaining said bore true to the desired conical form of the same, said large end portion of the tapered bore presenting a smooth peripheral surface complementary to and engaging the smooth peripheral surface of said annular portion of said closure, said closure being non-rotatively fixed relative to the body, and a continuous circular weld connection between the outer side of the closure and the adjacent annular wall portion of the body for retaining the closure in operative position.

References Cited in the file of this patent

FOREIGN PATENTS

| 213,574 | Australia | 1958 |
| 550,026 | Canada | 1957 |